United States Patent Office 3,211,277
Patented Oct. 12, 1965

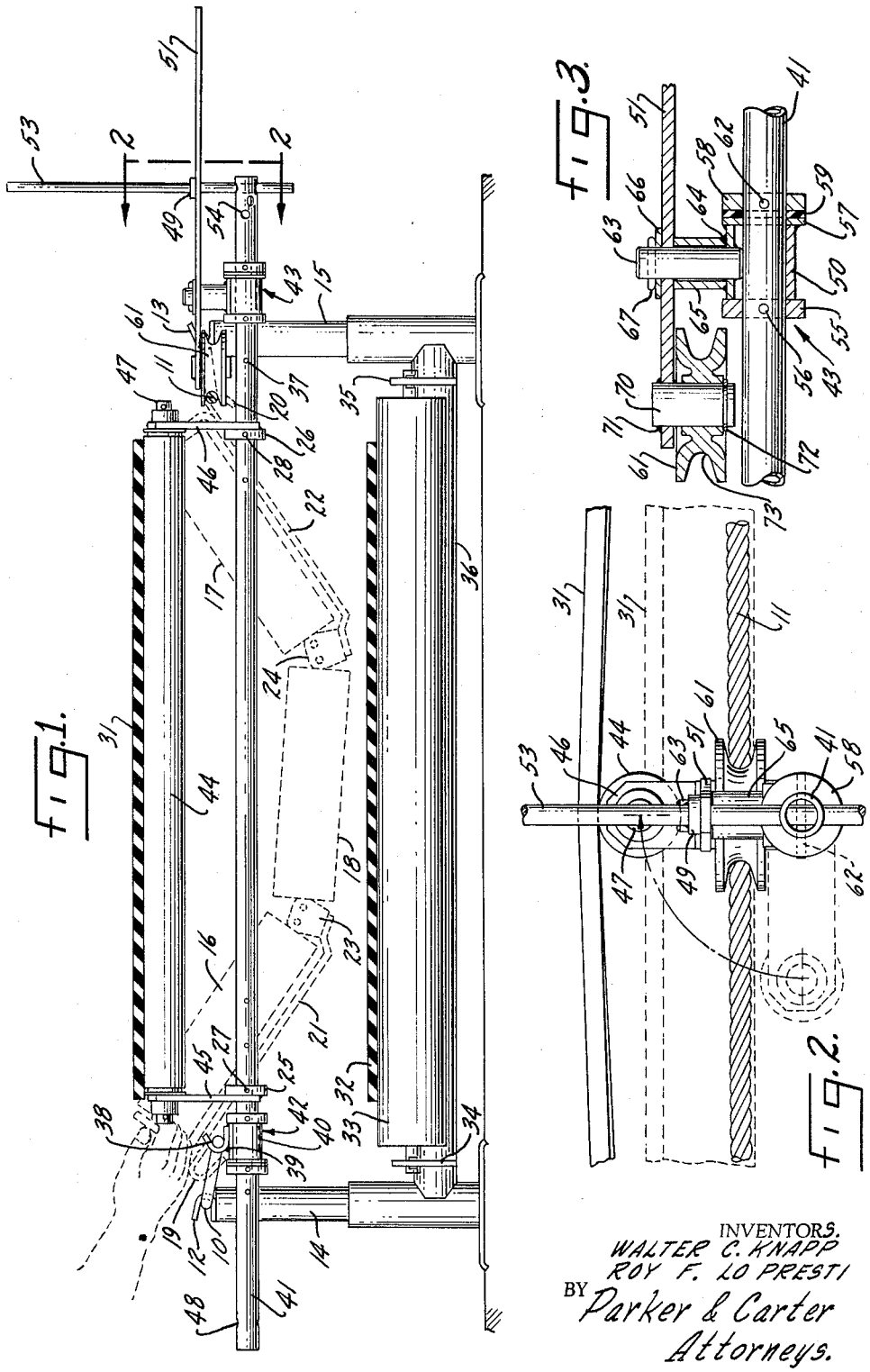

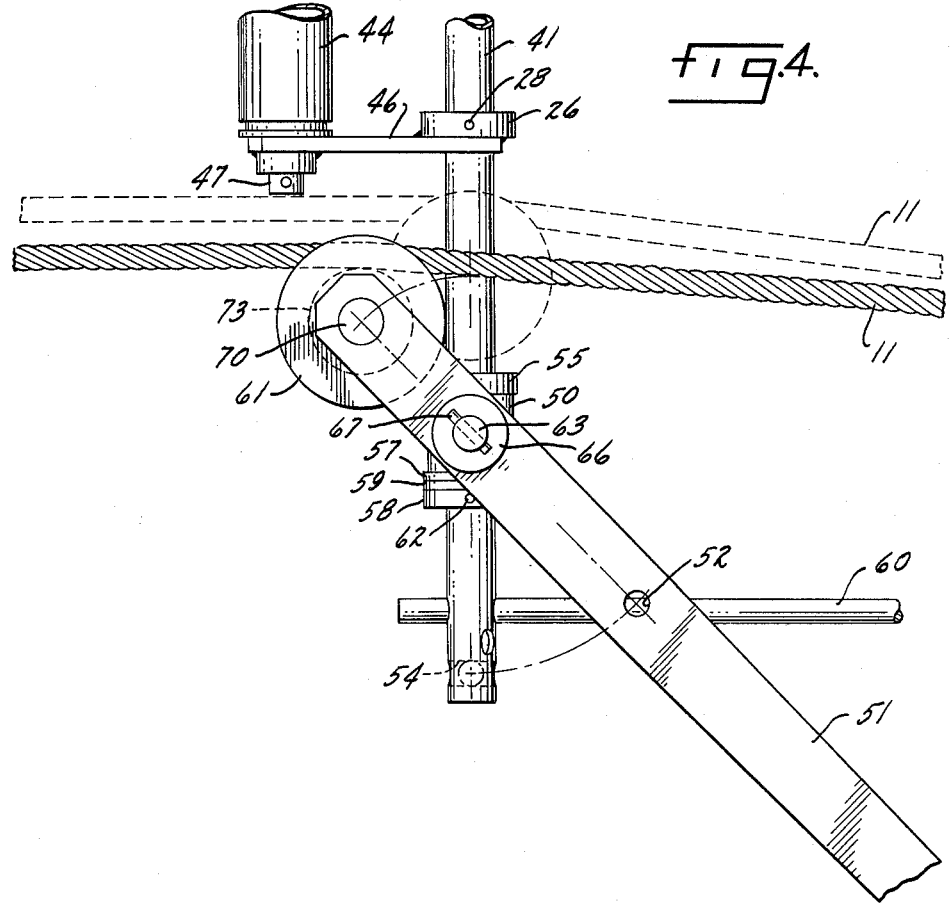

3,211,277
STRUCTURE FOR MOUNTING A TROUGHING IDLER ASSEMBLY
Walter C. Knapp and Roy F. Lo Presti, Chicago, Ill., assignors to Goodman Manufacturing Company, Chicago, Ill., a corporation of Illinois
Filed Apr. 3, 1962, Ser. No. 184,846
8 Claims. (Cl. 198—192)

This invention relates to a method for mounting a troughing idler assembly on a sideframe wire rope conveyor, and to a structure for performing the method.

An object of this invention is a method to more simply mount a troughing idler assembly in a flexible sideframe wire rope conveyor.

Another object is a method for mounting a troughing idler assembly by suspending the assembly between inwardly positioned wire ropes.

Another object is a method for mounting a troughing idler assembly by inwardly flexing the wire ropes and raising the conveying reach of an endless conveyor belt.

Another object is a method for replacing troughing idler assemblies in a wire rope sideframe conveyor while the endless belt is running.

Another object is a method for replacing a troughing idler assembly by inwardly flexing the wire ropes, raising the conveying reach of a running conveyor belt, replacing the assembly between the ropes, and then returning the inwardly flexed wire ropes and the raised conveying reach to their normal positions.

Another object is a method for mounting a troughing idler assembly by fixing an elongated member to the wire ropes, inwardly flexing the wire ropes by means fixed to the member and raising the conveying reach of an endless conveyor belt.

Another object is a structure for mounting a troughing idler assembly on a flexible sideframe wire rope conveyor.

Another object is a structure for mounting a troughing idler assembly which is connected to wire ropes, and which has a pivotal arm for engaging and inwardly flexing a wire rope.

Another object is a structure for mounting a troughing idler assembly in which one end of a shaft engages the wire ropes and the other end of the shaft has a pivotal arm with means for engaging and inwardly flexing a wire rope.

Another object is a structure for mounting a troughing idler assembly in which an extending shaft has means at one end for engaging one wire rope, means on the other end for inwardly flexing the other wire rope, and means intermediate the ends for raising the conveying reach of an endless conveyor belt.

The foregoing objects may now be attained by the invention which will be described in detail and which is illustrated in the accompanying drawings wherein:

FIGURE 1 is a front view of the structure positioned between stands of a flexible sideframe wire rope conveyor,
FIGURE 2 is a view along line 2—2 of FIGURE 1,
FIGURE 3 is a side view partially in section of one end of the shaft showing the cylinder member, pivotal arm, and rope engaging means, and
FIGURE 4 is a partial top plan view of the pivotal arm engaging the wire rope.

Like numerals in the various views will refer to the same elements.

FIGURE 1 shows the mounting structure fixed to laterally spaced wire ropes 10 and 11. The wire ropes are seated in rope seats or hooks 12 and 13 which are fixed to the top of spaced support stands 14 and 15. A sideframe wire rope conveyor has a series of such support stands along its length. The wire ropes extend along the length of the conveyor and support therebetween at spaced positions troughing idler assemblies. The troughing idler assembly, shown in phantom outline in FIGURE 1, includes wing rollers 16, 17 which flank a center roller 18. The troughing idler assembly in phantom outline is shown as having cradles 21 and 22 under the wing rollers, and rope seats or hooks 19 and 20 for engaging the wire ropes. The wing rollers and center roller rotate about dead shafts which are not shown, and the rollers may be connected to one another by articulating links such as 23 and 24. In the operating sideframe conveyor, the troughing idler assembly carries the conveying reach 31 of an endless conveyor belt. The return reach 32 of the belt is generally carried by a return roller 33 which is spaced by brackets such as at 34, 35 to a crossbrace 36 extending between the stands. The conveying reach 31 in FIGURE 1 is shown supported on an element of the mounting structure, but in the operation, the conveying reach 31 will ride on the wing and center rollers.

The mounting structure is shown as having a shaft 41 extending beyond support stands 14 and 15. Towards each end of the shaft 41 are positioned cylinder arrangements shown generally as 42 and 43. Intermediate the ends of the shaft is an elevated roller 44 which is spaced from shaft 41 by brackets 45 and 46. The roller 44 rotates around a dead shaft 47. The brackets may be positioned by spacers 25, 26 fixed to shaft 41 by rollpins 27 and 28 and engaging matching holes in the spacer and shaft. Fixed to cylinder arrangement 43 is pivotal lever or arm 51 which is connected at its inner end to a wire rope engaging sheave or grooved wheel 61. Arm 51 is apertured at 52 to receive a key rod 53 which immovably fixes lever 51 by engaging one of the bores such as at 54 in the end of shaft 41. A stop 49 positions key rod 53 between the lever arm and the shaft.

The cylinder arrangement 43 and its adjoining parts may be better seen in the section view of FIGURE 3. The cylinder arrangement is shown as having a sleeve 50 in which shaft 41 turns. One end of the sleeve adjoins or abuts a fixed spacer or stop 55 which is fixed to shaft 41 by a rollpin or the like 56 engaging matching holes in the spacer and shaft. The outer end of the sleeve 50 is integrally joined to an annular band 57 which is separated from stop or spacer 58 by a rubber gasket 59. The gasket or equivalent material permits rotation of abutting stop 58 with respect to gasket 59 when shaft 41 is turned, but provides sufficient frictional resistance so that the shaft does not freely rotate within the sleeve.

Sleeve 50 has a passageway through which is inserted lever pin 63. The lever pin is fixed in the sleeve 50 by weld means or the like 64. Pin sleeve 65 is placed between lever arm 51 and sleeve 50. Lever arm 51 may then pivotally move on the top edge of pin sleeve 65. The arm 51 is restricted from axial movement by pin sleeve 65 on one side and stop or washer 66 on the other side. The stop 66 is held in place by locking pin 67 inserted through a bore in the lever pin. The arm 51 is thereby permitted to freely pivot in a horizontal plane but is restricted for any axial movement.

The inner end of lever arm 51 supports a sheave or grooved wheel 61. Arm 51 receives sheave pin 70 which is fixed to the arm by welds or equivalent means 71. The grooved wheel or sheave 61 rotates about pin 70 and is held in place by stop or snap ring 72 which engages an annular groove in the bottom of pin 70. Sheave 61 has a continuous groove 73 which engages wire rope 11. The lever arm 51 is pivotally moved in a horizontal plane to engage the rope and to flex the rope inward, as indicated by phantom outline in FIGURE 4.

When the rope is fully flexed as shown, then aperture 52 in arm 51 is superimposed over bore 54 in shaft 41 to receive anchoring rod 53. The aligned position of aperture 52 is shown by the round phantom outline. The key rod locks the lever arm 51 in line with shaft 41. The flexing of rope 11 by the sheave also causes rope 10 to be flexed because the distance between rope seat 38 and sheave 61 is shortened as the sheave is pivoted.

Cylinder arrangement 42 on the other end of the shaft is flanked by a spacer or stop on one end and an annular band separated by a rubber gasket or the like from another spacer on the other end in a manner similar to that of cylinder arrangement 43. Arrangement 42 has a sleeve 40 in which shaft 41 may turn. Fixed to sleeve 40 by weld 39 or equivalent means is a rope seat or hook 38 to engage wire rope 10.

The shaft 41 is adapted to be turned or rotated within sleeves 40 and 50 when a turn rod such as 60 (FIGURE 4) is inserted through one of the apertures such as 54 in the end of the shaft. The shaft may likewise be rotated by inserting a turn rod in an aperture such as 48 on the other end of the shaft. It will be apparent that key rod 53 may also be used for this purpose. The sleeves 40 and 50 have an internal diameter larger than the diameter of the shaft to permit the shaft to turn or rotate in the sleeves. Spacers 55 and 58 on member 43 and the corresponding spacers of member 42 move with the shaft because they are fixed thereto by rollpins such as 56, 62 engaging matching holes in the spacers and shaft. The shaft may have other holes spaced along its length such as at 37 to receive spacers or stops so the same structure may be used for belts of different widths. For example, the mounting structure shown may be used with 36-inch belts and adjusted for use with 42-inch belts.

When the shaft is rotated, the brackets 45 and 46 and the roller 44 fixed therebetween also move with the shaft. The turning or rotating shaft 41 raises, as indicated by phantom outline in FIGURE 2, to an elevated position and thereby raises the conveying reach of the endless belt 31. This permits access between the reaches of the belt to facilitate removal and replacement of a defective idler assembly. During the foregoing operation, the belt may continue to run, and the roller 44 provides a rolling surface for such a running belt.

The use and operation of my invention are as follows:

The method and structure described herein may be adapted and used in a number of ways, such as mounting troughing assemblies in new conveyors, and replacing damaged or worn assemblies in working conveyors. A particular advantage resides in employing the method and structure for replacing defective assemblies in a running conveyor. In particular, it is possible to remove and replace a troughing assembly without shutting down the operating conveyor. In many mine operations, surge loads of coal are placed on the running belt and such loads are separated by extended belt surfaces which carry no load. A defective assembly may be quickly removed and replaced between such surge loads on the running belt. The use of the method and structure for such an operation shall be described, but it is understood that such a teaching may be carried over and extended to other uses.

A troughing idler assembly may be removed and a new assembly may be mounted in the conveyor by placing an elongated member, such as shaft 41, between stands 14 and 15, and engaging a rope seat 38 in one end of the shaft around rope 10. Rope seat 38, in turn, is fixed to cylinder arrangement 42 on one end of shaft 41. The other end of shaft 41 has a cylinder arrangement 43 having means to engage and flex wire rope 11 towards the other wire rope, and to be firmly engaged with such a flexed wire rope. The cylinder arrangements have been shown herein as having sleeves 40 and 50 around the opposed ends of shaft 41. Such sleeves do not move laterally along shaft 41 because of fixed spacers such as 55 and 58 on each side of sleeve 50. Sleeve 50 is preferably adapted for increasing frictional contact with stop or spacer 58 by placing a rubber gasket or the like 59 between annular band 57 fixed to one edge of the sleeve and said spacer. The gasket is squeezed somewhat to attain frictional contact.

When shaft 41 is initially engaged to rope 10 by rope seat 38, the elevated roller 44 is in a generally lowered position. A turn rod 60 is inserted in a bore in the end of shaft 41 so that the length of the rod can be grasped for turning and rotating the shaft. Lever arm 51 is pivotally turned on pin 63 fixed to sleeve 50 of cylinder arrangement 43. The sheave 61 connected to the inner end of arm 51 makes initial contact with the non-flexed wire rope 11 which is laterally spaced in parallel fashion from wire rope 10. The lever arm 51 is pivoted about pin 63 so that wire rope 11 is moved towards wire rope 10 or is flexed inwards as indicated by the phantom outline of FIGURE 4. This action flexes both ropes towards each other. Shaft 41 is then rotated between surge loads on the running belt by turning rod 60, and this moves roller 44 from a generally lowered position to the raised position shown in FIGURES 1 and 2. This movement raises the conveying reach 31 of the running belt from the troughing assembly, as indicated schematically in phantom outline, to the raised position as shown in the view of FIGURE 2. The lever arm 51 will be aligned generally along its length with now rotated shaft 41 and aperture 52 in lever 51 will be superimposed over aperture 54 in shaft 41. A key rod 53 may then be placed in the apertures to fix lever 51.

The defective troughing idler assembly may then be removed between surge loads on the belt by disengaging rope seat or hook 19 from cradle 21 on one wing roller shaft from wire rope 10 as indicated by the operator's hand in the phantom outline. Rope seat or hook 20 from cradle 22 under wing roller shaft 17 is then disengaged from rope 11. A new assembly is mounted by first securing hook 20 to rope 11 and then placing hook 19 about rope 10. The mounted troughing idler assembly will assume an exaggerated bowed configuration because of the flexed ropes.

The shaft may again be rotated in the cylinder arrangements with the help of turn rod 60 until elevated roller 44 is lowered and the conveying reach 31 of the running belt is brought into seating engagement on the properly positioned troughing idler assembly. The sheave 61 is then disengaged from wire rope 11 which returns the rope to its normal position and thereby pulls the troughing assembly apart so that it assumes its predetermined bowed configuration.

The operator may selectively change the sequence of the steps described in practicing the method to suit convenience or a particular mounting assembly. It is possible for a single operator to rotate shaft 41 by working the turn rod 60 with the one hand and flex the wire ropes by working the lever 51 with the other hand. Another operator may alternatively turn the shaft at the other end. The key rod 53 may then be inserted to immovably fix the lever arm, and the assembly may be replaced. The cylinder arrangements 42 and 43 may be placed at various positions along the length of the shaft by fixing spacers such as 55 and 58 at the various holes along the shaft such as at 37. The elevated roller 44 may likewise be varied in position. It is seen that a mounting may be adapted for troughing idler assemblies of differing widths.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:

1. A structure adapted to prepare a flexible side frame wire rope conveyor with endless belt for removing and mounting a troughing idling assembly which includes, in combination,
- an elongated member extending between laterally spaced wire ropes of the side frame conveyor,
- a first cylinder arrangement on one end of the elongated member with means to engage one wire rope,
- a second cylinder arrangement on the other end of the elongated member, said elongated member rotatable within the cylinder arrangements,
- means on the elongated member to contact and raise a part of the endless belt when the elongated member is turned,
- an arm pivotally connected to the second cylinder arrangement,
- and means on the arm to engage and flex the adjacent wire towards the other wire rope so that a troughing idler assembly may be mounted on the ropes, and the wires may resume an unflexed position when the structure is removed.

2. The structure of claim 1 further characterized in that the means to engageably move the wire rope is a rotatable sheave.

3. The structure of claim 1 further characterized in that the cylinder arrangements may be adjustably positioned along the length of the elongated member.

4. The structure of claim 1 further characterized by and including means to releasably fix the arm so that it will maintain the wire rope's position while the troughing idler assembly is being mounted.

5. The structure of claim 4 further characterized by and including immovable fixed spacers to position the cylinder arrangements on the shaft.

6. The structure of claim 4 further characterized by and including turning means on the rod to rotate said shaft.

7. A structure adapted to prepare a flexible side frame wire rope conveyor with endless belt for removing and mounting a troughing idler assembly which includes, in combination,
- a shaft extending between laterally spaced wire ropes of the side frame conveyor,
- a first cylinder arrangement on one end of the shaft,
- a rope seat to said cylinder arrangement,
- a second cylinder arrangement on the other end of the shaft, said shaft rotatable within the cylinder arrangements,
- a roller attached to the shaft to contact and raise a part of the belt when the shaft is rotated,
- a movable lever arm on the shaft and a rotatable sheave on the lever arm to engage the adjacent wire rope so that a troughing idler assembly may be mounted on the wire ropes and the wires may resume an unflexed position when the structure is removed.

8. A structure for mounting a troughing idler assembly on a flexible sideframe conveyor which includes, in combination,
- an annular shaft extending between laterally spaced wire ropes,
- a cylinder on one end of the shaft positioned by spacers immovably fixed to the shaft, a rope seat fixed to the cylinder,
- a second cylinder on the other end of the shaft positioned on the shaft by spacers immovably fixed to the shaft, a lever arm pivotally fixed to the cylinder for horizontal movement, said shaft adapted to be turned within the cylinders,
- a rotatable sheave fixed to the lever arm to engage and flex the adjacent rope when the arm is moved,
- an elevated roller intermediate the ends of the shaft, said roller adapted to be elevated when the shaft is rotated, and spaced from the shaft by fixed brackets,
- means to rotate the shaft, and means to immovably fix the lever arm.

References Cited by the Examiner

UNITED STATES PATENTS

| | | | |
|---|---|---|---|
| 592,099 | 10/97 | Schwalm | 254—198 |
| 1,530,499 | 3/25 | Knode | 198—192 |
| 1,691,397 | 11/28 | Lockwood et al. | 254—135 |
| 2,085,599 | 6/37 | Paluch | 254—44 X |
| 2,678,803 | 5/54 | Wilkerson | 254—114 |
| 3,101,192 | 8/63 | Stinson | 198—192 |

FOREIGN PATENTS 669,534  12/38  Germany.

SAMUEL F. COLEMAN, *Primary Examiner.*

WILLIAM B. LA BORDE, *Examiner.*